United States Patent
Yamamoto et al.

(10) Patent No.: US 10,730,468 B2
(45) Date of Patent: Aug. 4, 2020

(54) VEHICLE INTERIOR COMPONENT

(71) Applicant: TS TECH CO., LTD., Saitama (JP)

(72) Inventors: Tetsuhisa Yamamoto, Tochigi (JP); Tatsuki Nonaka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 180 days.

(21) Appl. No.: 16/075,242

(22) PCT Filed: Feb. 3, 2017

(86) PCT No.: PCT/JP2017/003983
§ 371 (c)(1),
(2) Date: Aug. 3, 2018

(87) PCT Pub. No.: WO2017/135407
PCT Pub. Date: Aug. 10, 2017

(65) Prior Publication Data
US 2019/0039547 A1    Feb. 7, 2019

(30) Foreign Application Priority Data
Feb. 4, 2016    (JP) .................................. 2016-020028

(51) Int. Cl.
*B60J 7/00*        (2006.01)
*B60R 21/04*       (2006.01)
(Continued)

(52) U.S. Cl.
CPC ......... *B60R 21/0428* (2013.01); *B60J 5/0451* (2013.01); *B60R 13/0206* (2013.01); *B60R 13/0243* (2013.01); *F16F 7/12* (2013.01)

(58) Field of Classification Search
CPC ................ B60J 5/0416; B60R 13/0243; B60R 13/0206; B60R 2013/0281;
(Continued)

(56) References Cited

U.S. PATENT DOCUMENTS 3,989,275 A * 11/1976 Finch .................. B60R 21/0428
                                                    280/751
5,395,135 A *  3/1995 Lim ....................... B60J 5/0451
                                                    280/751
(Continued)

FOREIGN PATENT DOCUMENTS

JP      H10-250514 A     9/1998
JP      2001-239834 A    9/2001
(Continued)

OTHER PUBLICATIONS

International Search Report dated Apr. 4, 2017 for corresponding PCT Application No. PCT/JP2017/003983.

*Primary Examiner* — Kiran B Patel
(74) *Attorney, Agent, or Firm* — Michael Best & Friedrich LLP

(57) ABSTRACT

A vehicle interior component, having rigidity for mitigating an impact from a side collision, includes a door panel, a door trim adapted to be attached to the door panel, and a box-shaped protector arranged between the door panel and the door trim and attached to one of the door panel and the door trim. An outer wall groove extending in a vehicle front to back direction is formed in an outer wall of the protector, which is opposite to the other of the door panel and the door trim. The outer wall is partitioned by the outer wall groove in an up to down direction into an upper opposite surface and a lower opposite surface, and one of the upper opposite surface and the lower opposite surface has an up-down length at a vehicle front side, which is larger than an up-down length at a vehicle rear side.

4 Claims, 7 Drawing Sheets

(51) Int. Cl.
   *B60J 5/04* (2006.01)
   *F16F 7/12* (2006.01)
   *B60R 13/02* (2006.01)

(58) Field of Classification Search
   CPC .... B60R 2013/0287; B60R 2021/0006; B60R 21/207; B60R 21/0132; B60R 21/0136; B60R 21/0428
   See application file for complete search history.

(56) References Cited

U.S. PATENT DOCUMENTS

| | | | | |
|---|---|---|---|---|
| 5,482,344 | A * | 1/1996 | Walker | B60R 21/0428 280/751 |
| 5,577,794 | A * | 11/1996 | Gandhi | B60J 5/0425 280/750 |
| 5,749,600 | A * | 5/1998 | Yamada | B60J 5/0425 280/751 |
| 5,857,702 | A * | 1/1999 | Suga | B60J 5/0451 280/751 |
| 5,865,496 | A * | 2/1999 | Odan | B60J 5/0425 280/751 |
| 5,927,020 | A * | 7/1999 | Kobrehel | B60J 5/0416 49/146 |
| 6,073,990 | A * | 6/2000 | Sauve | B29C 63/0082 29/91 |
| 6,568,743 | B1 * | 5/2003 | Jayasuriya | B60N 2/42727 296/153 |
| 7,992,920 | B2 * | 8/2011 | Deng | B60J 5/042 296/146.6 |
| 9,233,660 | B1 * | 1/2016 | Farooq | B60N 2/78 |
| 2001/0017476 | A1 | 8/2001 | Nishikawa et al. | |
| 2009/0026801 | A1 * | 1/2009 | Murayama | B60R 19/18 296/187.05 |
| 2009/0102234 | A1 | 4/2009 | Heatherington et al. | |
| 2009/0278380 | A1 * | 11/2009 | Bhattacharjee | B60J 5/0451 296/146.6 |
| 2009/0284041 | A1 * | 11/2009 | Hall | B60J 5/0451 296/146.6 |
| 2010/0225144 | A1 | 9/2010 | Endo et al. | |
| 2010/0259069 | A1 * | 10/2010 | Suzuki | B60J 5/0451 296/187.12 |
| 2012/0119541 | A1 * | 5/2012 | Markusic | B60R 13/02 296/187.05 |
| 2012/0235443 | A1 * | 9/2012 | Tamada | B60J 5/0451 296/187.05 |
| 2013/0015644 | A1 * | 1/2013 | Tamura | B60R 21/0428 280/730.2 |
| 2014/0035322 | A1 * | 2/2014 | Sakhara | B62D 25/02 296/187.12 |
| 2015/0115585 | A1 * | 4/2015 | Smith | B60R 21/0428 280/751 |
| 2015/0298637 | A1 * | 10/2015 | Hase | B60R 21/0428 296/187.12 |
| 2015/0337917 | A1 * | 11/2015 | Tamada | B60R 21/04 188/371 |
| 2016/0215843 | A1 * | 7/2016 | Tamada | B60R 21/04 |
| 2016/0339862 | A1 * | 11/2016 | Deng | B60R 21/0428 |
| 2017/0057330 | A1 * | 3/2017 | Hamdoon | B60J 5/0456 |
| 2018/0111454 | A1 * | 4/2018 | Arimoto | B60J 5/0455 |
| 2018/0126828 | A1 * | 5/2018 | Vemulapati | B60J 5/0461 |
| 2018/0257597 | A1 * | 9/2018 | Migaki | B60R 21/0428 |
| 2019/0161026 | A1 * | 5/2019 | Migaki | B60R 13/0243 |
| 2019/0232888 | A1 * | 8/2019 | Burke | B62D 65/14 |
| 2019/0291682 | A1 * | 9/2019 | Sadr | B60R 21/207 |
| 2019/0389104 | A1 * | 12/2019 | Heikkila | B29C 45/14196 |

FOREIGN PATENT DOCUMENTS

| | | |
|---|---|---|
| JP | 2005-343255 A | 12/2005 |
| JP | 2006-125531 A | 5/2006 |

* cited by examiner

VEHICLE INTERIOR COMPONENT

CROSS-REFERENCE TO RELATED APPLICATIONS

This application is entering into national phase of PCT Application Number PCT/JP2017/003983, filed on Feb. 3, 2017. Further, this application claims the benefit of priority from Japanese Application Number 2016-020028, filed on Feb. 4, 2016, the entire contents of which are incorporated herein by reference.

TECHNICAL FIELD

The present invention relates to a vehicle interior component and, in particular, to a vehicle interior component associated with a door component including an impact absorbing member.

BACKGROUND ART

Conventionally, some of side doors used in vehicles have been known as side doors each including a protector of synthetic resin for absorbing an impact at the time of a side-impact collision.

For example, Patent Literature 1 describes an automobile door that includes a side impact pad integrally with a door panel (described as a panel member in Patent Literature 1). The side impact pad has plural ribs and serves as a protector that is an impact absorbing member.

CITATION LIST

Patent Literature

PATENT LITERATURE 1: JP 2001-239834 A

SUMMARY OF INVENTION

Technical Problem

However, the protector included in the automobile door according to Patent Literature 1 does not have different shapes at the front and rear of aside door. Therefore, the mitigation of load applied to the front and rear of an occupant held by a seat belt at the time of a side collision cannot be adjusted. Also, the protector has rigidity enhanced by the ribs. However, since a load applied from the protector to the occupant increases in proportion to an impact at the time of the side collision, impact mitigation performance of the protector is not high.

The present invention is thus made in view of the above problem, and an object of the present invention is to provide a vehicle interior component including appropriate rigidity for mitigating an impact from a side collision.

Solution to Problem

The above-mentioned problem is solved by a vehicle interior component according to an aspect of the present invention, the vehicle interior component including a door panel, a door trim adapted to be attached to the door panel, and a box-shaped impact absorbing member arranged between the door panel and the door trim and attached to one of the door panel and the door trim. A groove extending in a vehicle front to back direction is formed in an opposite surface of the impact absorbing member, which is opposite to the other of the door panel and the door trim. The opposite surface is partitioned into upper and lower partitioned surfaces by the groove, and at least one of the upper and lower partitioned surfaces has an up-down length at a vehicle front side, which is larger than an up-down length at a vehicle rear side.

In the vehicle interior component according to the aspect of the present invention as configured above, the impact absorbing member attached to one of the door panel and the door trim is configured such that the opposite surface opposite to the other of the door panel and the door trim has the long up-down length at the vehicle front side. Therefore, an impact applied to the vehicle front side of the impact absorbing member at the time of a side collision can be absorbed more easily than at the vehicle rear side.

Also, at least one of the partitioned surfaces may be formed in a tapered shape such that an up-down length decreases from the vehicle front side toward the vehicle rear side.

In the above configuration, at least one of the partitioned surfaces is formed in a tapered shape; therefore, a load is easily applied locally to the partitioned surfaces at the time of a side collision and a portion including the partitioned surfaces is easily crushed into the groove. As a result, an impact applied to the impact absorbing member at the time of the side collision can be absorbed at the vehicle front side more effectively than at the vehicle rear side.

Further, the impact absorbing member may include an attachment portion attached to one of the door panel and the door trim. The attachment portion may be formed at a portion extending from a bottom surface of the groove, and the partitioned surfaces maybe arranged closer to the other of the door panel and the door trim than the attachment portion.

In the above configuration, the attachment portion is formed in the bottom surface of the groove. Thus, a portion including the partitioned surfaces is easily crushed into the groove at the time of a side collision and thereby an impact can be easily absorbed.

Furthermore, the impact absorbing member may be configured such that only the front side in the vehicle front to back direction is open without a wall surface.

In the above configuration, the impact absorbing member is configured such that only the front side in the vehicle front to back direction is open without a wall surface. Therefore, the front side in the vehicle front to back direction is easily distorted and thereby an impact applied to the vehicle front side of the impact absorbing member at the time of a side collision can be absorbed more easily than at the vehicle rear side.

Advantageous Effects of Invention

According to the present invention, a vehicle interior component including appropriate rigidity for mitigating an impact from a side collision can be provided.

DESCRIPTION OF EMBODIMENTS

Hereinafter, a configuration example of a side door component as a vehicle interior component according to an embodiment of the present invention (the present embodiment) will described. It is noted that the embodiment described below is intended to facilitate understanding of the present invention and is not intended to limit the present invention. In addition, it will be understood that the present invention may be changed and modified without departing from the scope of the present invention and that the present invention may include equivalents thereof.

Also, "a front to back direction" in the following descriptions herein corresponds to a vehicle front to back direction and is a direction coincident with a traveling direction of a vehicle. Moreover, "an inner to outer direction" is a direction coincident with a vehicle width direction.

Figure 1:
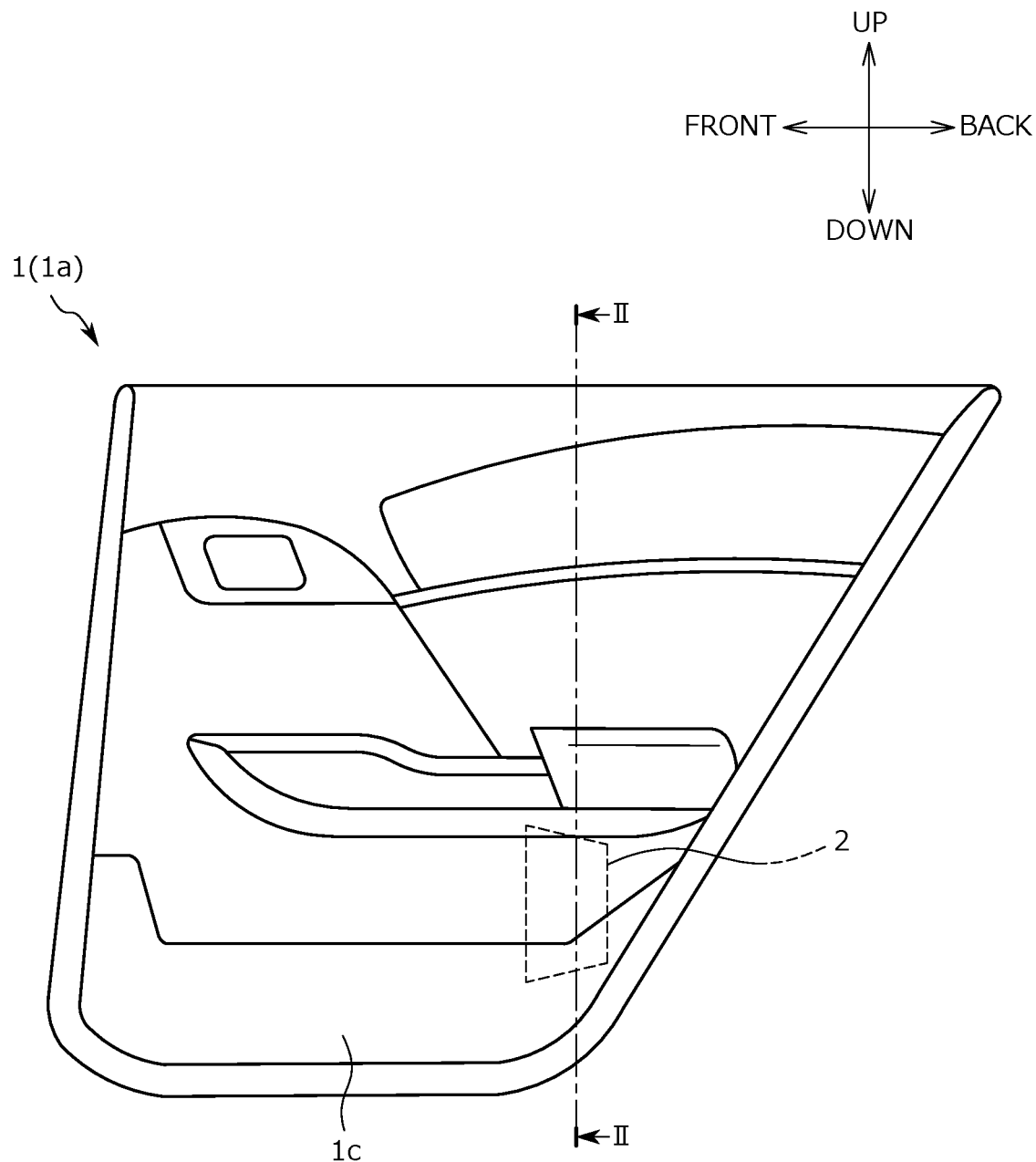
FIG. 1 is a front view of a side door component according to an embodiment of the present invention.
Figure 2:
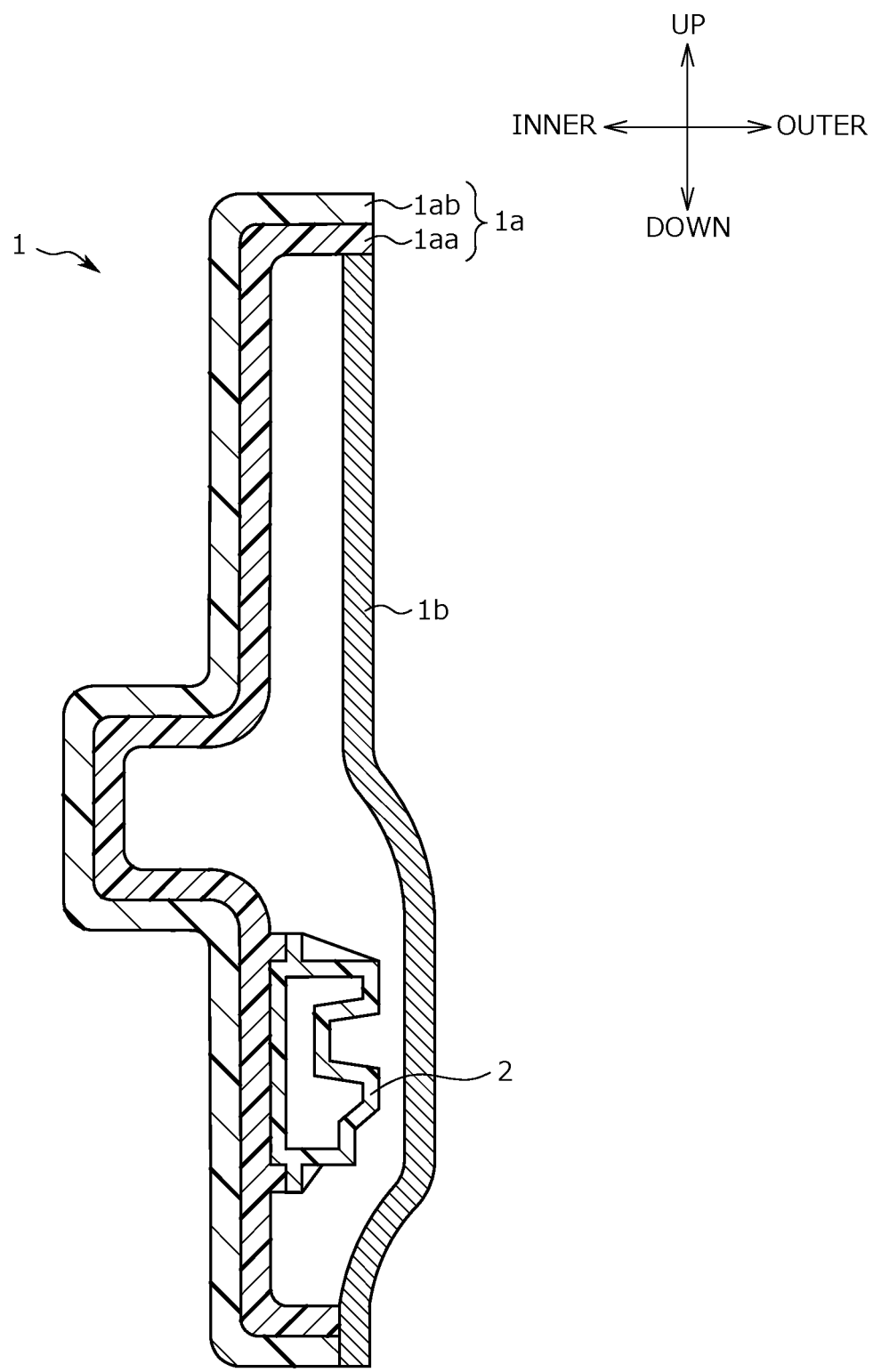
FIG. 2 is a schematic view showing a cross-section, taken along the line II-II in FIG. 1, of a door trim and a door panel that configure the side door component.
Figure 3:
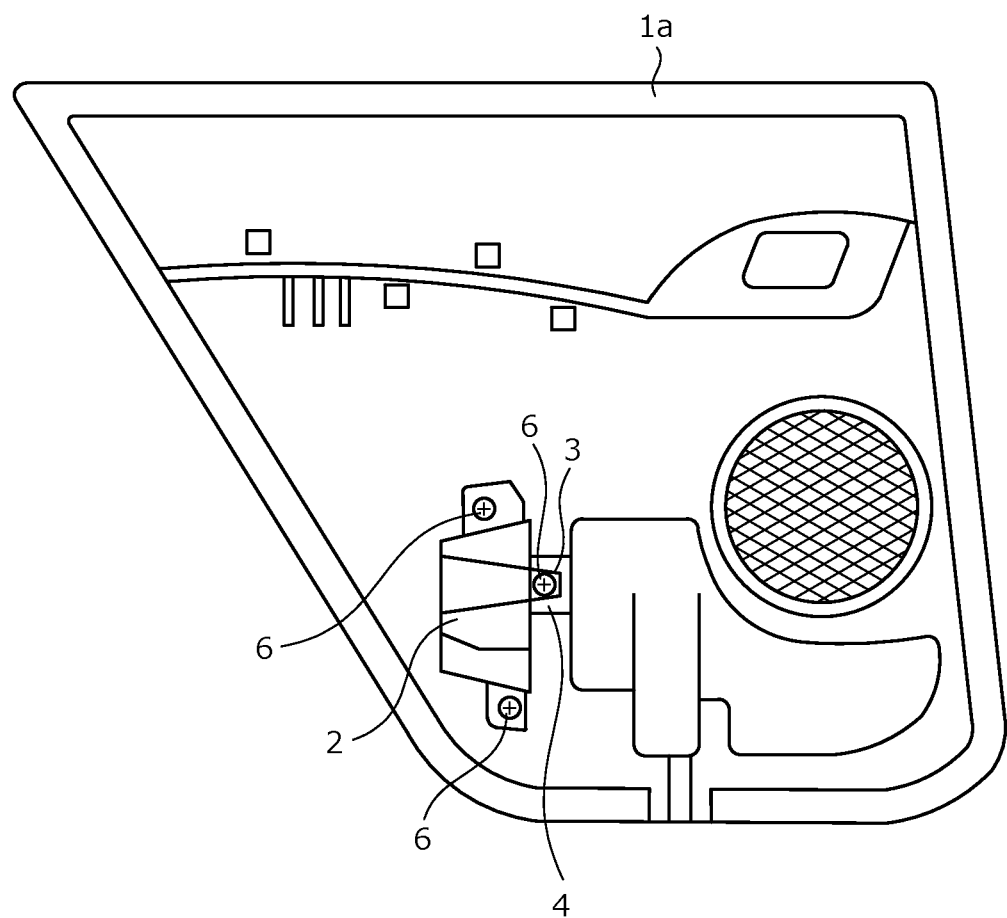
FIG. 3 is a schematic view showing an outside surface of the door trim in the vehicle width direction.
Figure 4:
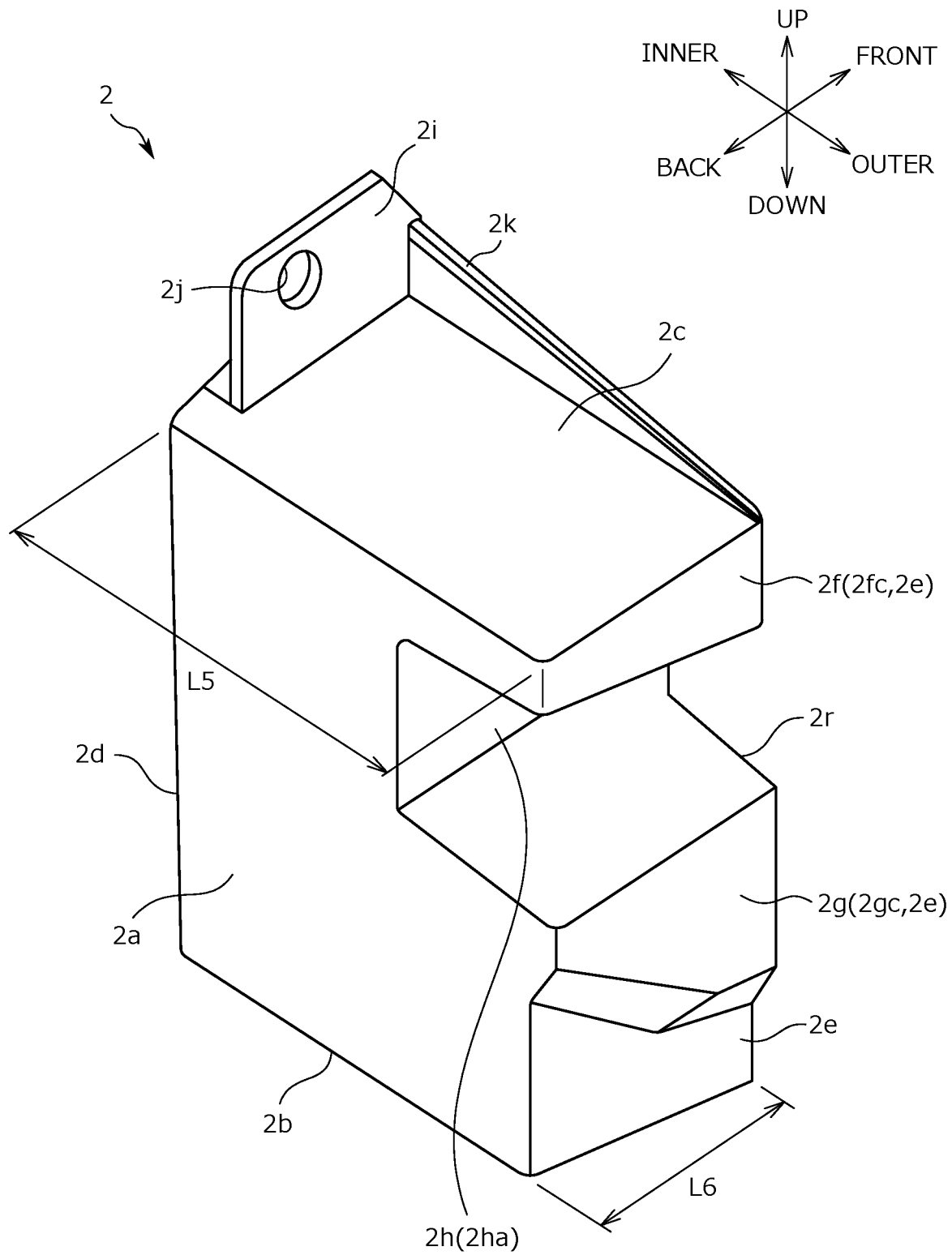
FIG. 4 is a perspective view showing a protector.
Figure 5:
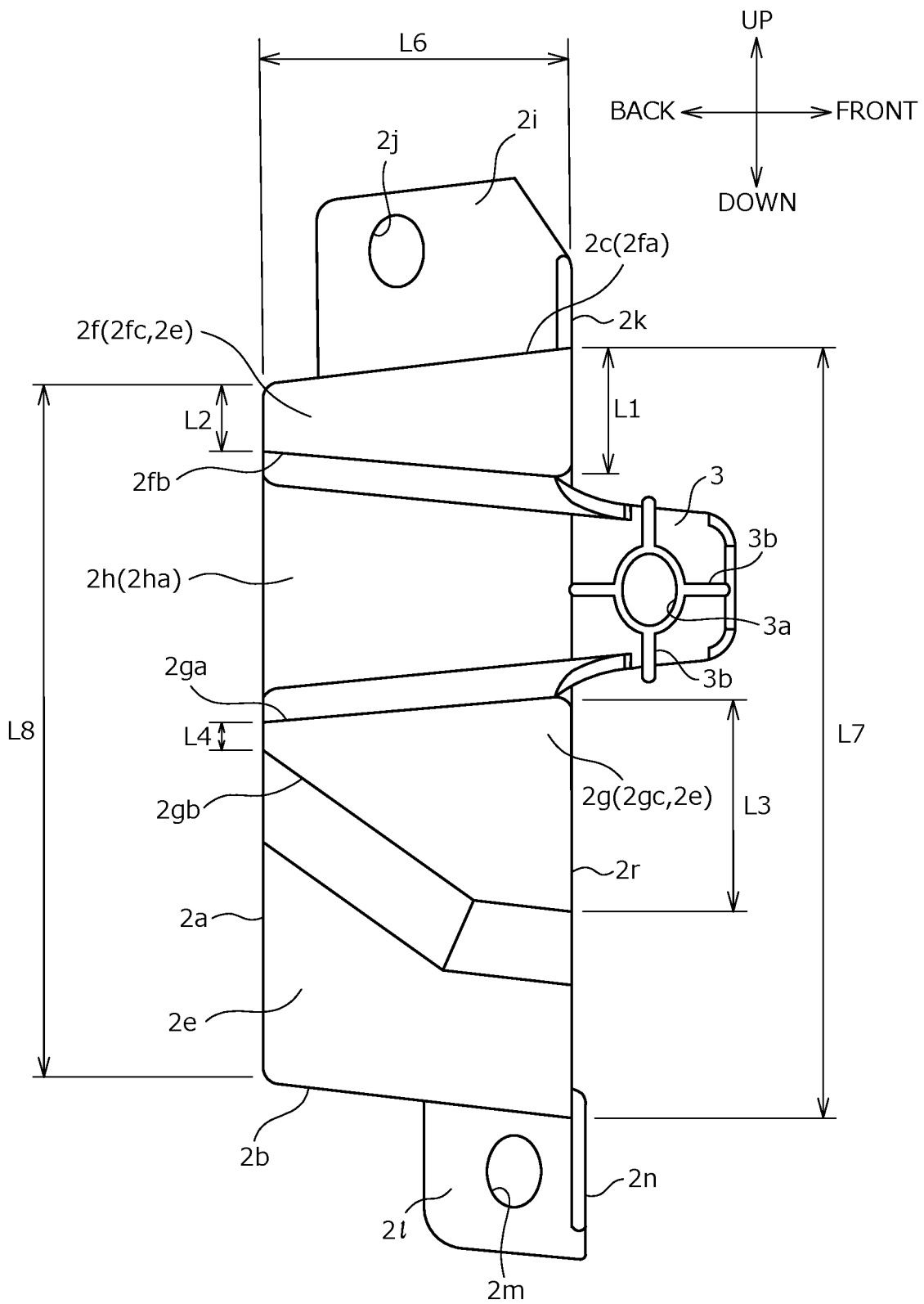
FIG. 5 is a view of the protector when seen from the outer side (the side of the door panel) in the vehicle width direction.
Figure 6:
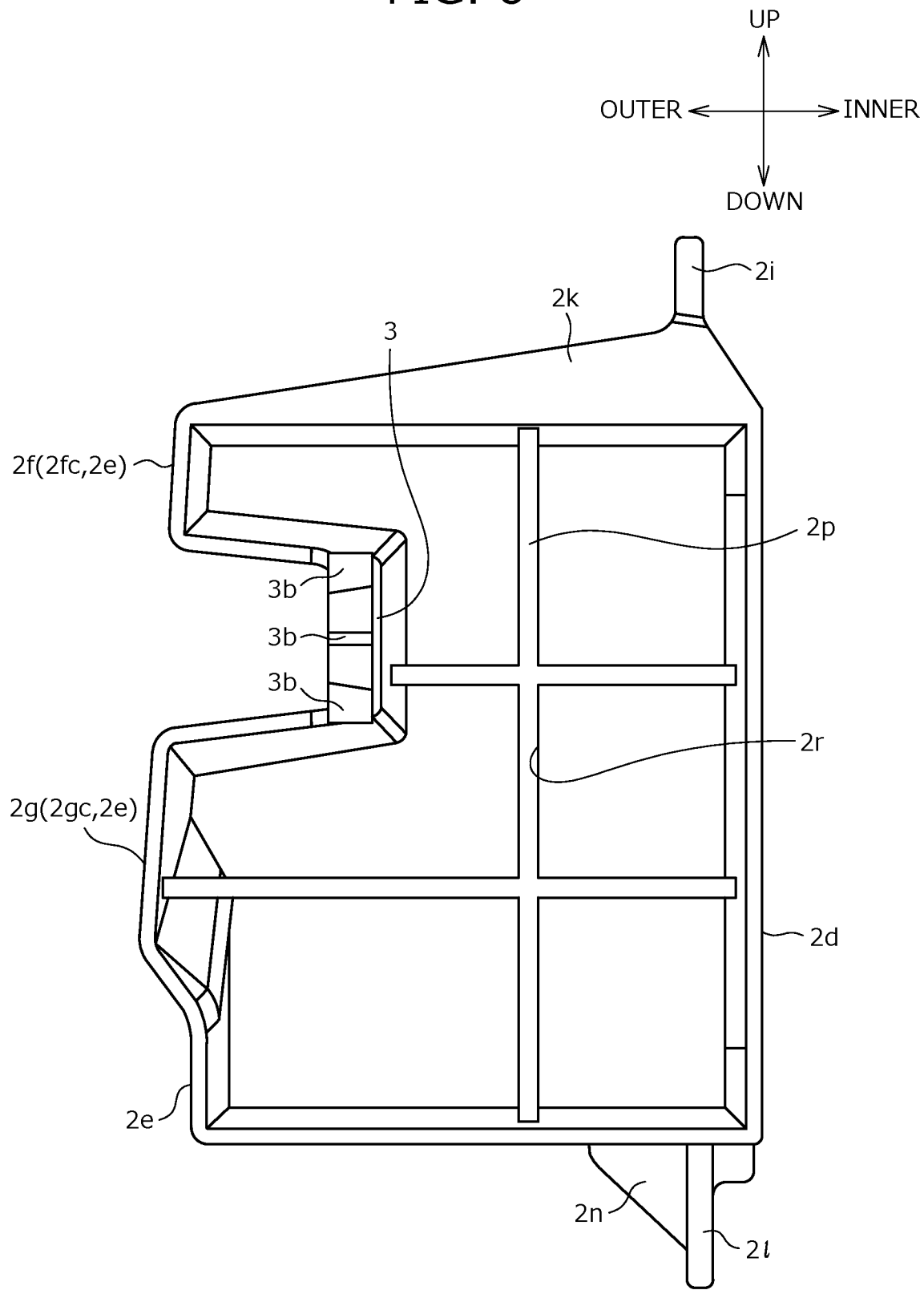
FIG. 6 is a view of the protector when seen from the front side in the vehicle front to back direction.

Aside door component 1 including a protector 2 according to the present embodiment will be described with reference to FIG. 1 to FIG. 6. FIG. 1 is a front view of the side door component 1 according to an embodiment of the present invention. FIG. 2 is a schematic view showing a cross-section, taken along the line II-II in FIG. 1, of a door trim 1*a* and a door panel 1*b* that configure the side door component 1. FIG. 3 is a schematic view showing an outside surface of the door trim 1*a* in the vehicle width direction. FIG. 4 is a perspective view showing a protector 2. FIG. 5 is a view of the protector 2 when seen from the outer side (the side of the door panel 1*b*) in the vehicle width direction. FIG. 6 is a view of the protector 2 when seen from the front side in the vehicle front to back direction.

The side door component 1 includes the door trim 1*a* located at the inner side in the vehicle width direction and the door panel 1*b* located at the outer side of the door trim 1*a* in the vehicle width direction and overlapped with the door trim 1*a* to be attached thereto. Specifically, as shown in FIG. 2, the door trim 1*a* is formed in a multi-layer structure of a base material resin layer 1*aa* and a covering resin layer 1*ab* that is layered on the inner side of the base material resin layer 1*aa* in the vehicle width direction.

In addition, the protector 2 as an impact absorbing member formed by injection molding and made of synthetic resin such as polypropylene is arranged between the door trim 1*a* and the door panel 1*b*.

The protector 2 is a member for enhancing rigidity of a side door and absorbing an impact applied at the time of a side collision of a vehicle. In the present embodiment, the protector 2 is fixed to a surface of the base material resin layer 1*aa* of the door trim 1*a*, which faces the door panel 1*b*. Also, the protector 2 may be made of any synthetic resin material other than polypropylene and may be formed by another molding method not by injection molding.

Also, the protector 2 is tightened by fasteners 6 such as tapping screws shown in FIG. 3 together with a door pocket 1*c* or the like to be attached to the door trim 1*a*. The protector 2 is attached to the door trim 1*a* in this manner; therefore, separate fasteners for the protector 2 from the fasteners 6 used for fixing the door pocket 1*c* to the door trim 1*a* are not needed. Consequently, cost increase can be inhibited. In addition, the protector 2 may be attached to the door trim 1*a* by thermal welding or swaging not by the fasteners 6 such as tapping screws. In such a configuration, separate fasters are not needed in the same way as above and the fasteners do not loosen; therefore, the protector 2 can be surely fixed to the door trim 1*a*.

Next, portions of the protector 2 will be described in detail with reference to FIG. 3 to FIG. 6.

The protector 2 is formed in a substantially box shape by mainly including: a rear wall 2*a* located at the rear side in the vehicle front to back direction; a lower wall 2*b*, an upper wall 2*c*, an inner wall 2*d*, and an outer wall 2*e* extending from respective lower, upper, inner, and outer rims of the rear wall 2*a* toward the front side in the vehicle front to back direction; and a middle attachment plate 3 described below in detail in a state where the protector 2 is attached to the door trim 1*a*. Also, in a state where the protector 2 is attached to the door trim 1*a*, the protector 2 does not include a wall at a front end portion 2*r* that is located at the front side in the vehicle front to back direction. In addition, the lower wall 2*b*, the upper wall 2*c*, the inner wall 2*d*, and the outer wall 2*e* are formed to be inclined such that the walls are entirely opened outward with respect to a forward projection of the rear wall 2*a*.

The rear wall 2*a* extends in the up to down direction and in the inner to outer direction. A cut portion cut substantially to the center from the outer wall 2*e* toward the inner wall 2*d* and thereby the rear wall 2*a* is formed in a recessed shape. The cut portion is an end-surface portion of an outer wall groove 2*h* described below.

As shown in FIG. 5, the lower wall 2*b* and the upper wall 2*c* extend while being inclined substantially symmetrically with respect to a horizontal surface (that is, a surface perpendicular to the rear wall 2*a*) such that an interval between the lower wall 2*b* and the upper wall 2*c* in the up to down direction increases from the rear wall 2*a* toward the front end portion 2*r*.

A lower attachment plate 2*l* extending perpendicularly to the rear wall 2*a* (substantially in parallel to the inner wall 2*d*) is formed on the lower wall 2*b* to be located adjacent to the inner wall 2*d* described below and to protrude downward. The lower attachment plate 2*l* includes a lower attachment hole 2*m* extending in the thickness direction. A lower portion of the protector 2 is fixed to the door trim 1*a* by the fastener 6 inserted into the lower attachment hole 2*m*. Also, a flange 2*n* is formed in a direction substantially perpendicular to the lower wall 2*b* in such a manner as to connect the lower attachment plate 2*l* and a front end of the lower wall 2*b*. As shown in FIG. 6, the flange 2*n* is formed in a substantially triangular shape such that the amount of protrusion from the lower wall 2*b* decreases from the lower attachment plate 2*l* toward the outer wall 2*e*.

An upper attachment plate 2*i* extending in parallel to the inner wall 2*d* is formed on the upper wall 2*c* to be located adjacent to the inner wall 2*d* and to protrude upward. The upper attachment plate 2*i* includes an upper attachment hole 2*j* extending in the thickness direction. An upper portion of the protector 2 is fixed to the door trim la by the fastener 6 inserted into the upper attachment hole 2*j*. Also, a flange 2*k* is formed in a direction substantially perpendicular to the upper wall 2*c* in such a manner as to connect the upper attachment plate 2*i* and a front end of the upper wall 2*c*. As shown in FIG. 4 the flange 2*k* is formed in a substantially triangular shape such that the amount of protrusion from the upper wall 2*c* decreases from the upper attachment plate 2*i* toward the outer wall 2*e*. In particular, the flange 2*k* is formed to extend from the upper attachment plate 2*i* to the outer wall 2e, compared with the flange 2n extending from the lower attachment plate 2l only to a position inward of the center in the vehicle width direction.

The inner wall 2d extends from the rear wall 2a to the front end portion 2r while being inclined toward the door trim 1a (that is, inward in the vehicle width direction) with respect to vertical surfaces of the rear wall 2a, which extend in the up to down direction and in the front to back direction.

The outer wall 2e is provided at a position opposite to the door panel 1b in a state where the protector 2 is fixed to the door trim 1a. The outer wall 2e is configured to include an upper opposite surface 2f and a lower opposite surface 2g as upper and lower partitioned surfaces into which the outer wall 2e is partitioned by the outer wall groove 2h described below.

As shown in FIG. 5, the upper opposite surface 2f is formed to include an upper edge 2fa and a lower edge 2fb which extend in a tapered shape such that the width in the up to down direction decreases from the front end portion 2r toward the rear wall 2a. That is, the upper opposite surface 2f is configured such that an up-down length L1 at the vehicle front side is larger than an up-down length L2 at the vehicle rear side.

Accordingly, the vehicle front side of the upper opposite surface 2f is easily distorted in the inner to outer direction by a load applied from the outer wall 2e to the protector 2 at the time of a side collision; therefore, an impact applied to the vehicle front side is easily absorbed.

The lower opposite surface 2g is formed to include an upper edge 2ga and a lower edge 2gb which extend in a tapered shape such that the width in the up to down direction decreases from the front end portion 2r to the rear wall 2a. In particular, the lower edge 2gb extends such that the extending angle is changed along the way.

Specifically, the upper edge 2ga of the lower opposite surface 2g and the lower edge 2fb of the upper opposite surface 2f extend while being inclined symmetrically with respect to a horizontal surface (that is, a surface perpendicular to the rear wall 2a). Meanwhile, one portion of the lower edge 2gb, which is located adjacent to the rear wall 2a is formed with an inclination angle in such a manner as to largely separate from the upper edge 2ga toward the front end portion 2r. Also, the other portion of the lower edge 2gb, which is connected to one portion of the lower edge 2gb and located adjacent to the front end portion 2r is formed with an inclination angle in such a manner as to separate from the upper edge 2ga toward the front end portion 2r. However, the other portion of the lower edge 2gb is formed with the inclination angle that is smaller, with respect to a horizontal surface, than the inclination angle of one portion of the lower edge 2gb, which is located adjacent to the rear wall 2a. In other words, the lower opposite surface 2g is configured such that an up-down length L3 at the vehicle front side is larger than an up-down length L4 at the vehicle rear side.

Accordingly, the vehicle front side of the lower opposite surface 2g is easily distorted in the inner to outer direction by a load applied from the outer wall 2e to the protector 2 at the time of a side collision; therefore, an impact applied to the vehicle front side is easily absorbed.

The outer wall groove 2h formed to be recessed toward the rear wall 2a is formed between the upper opposite surface 2f and the lower opposite surface 2g. In other words, an upper protrusion 2fc and a lower protrusion 2gc are formed by the outer wall groove 2h. The upper protrusion 2fc is a portion protruding from a bottom surface 2ha of the outer wall groove 2h toward the vehicle outer side (toward the door panel 1b) and being at the side of the upper opposite surface 2f. The lower protrusion 2gc is a portion protruding from the bottom surface 2ha of the outer wall groove 2h toward the vehicle outer side (toward the door panel 1b) and being at the side of the lower opposite surface 2g. The outer wall groove 2h forms a space between the upper protrusion 2fc and the lower protrusion 2gc and thereby allows the upper protrusion 2fc and the lower protrusion 2gc to be deformed by contacting the door panel 1b at the time of a side collision of the vehicle. Thus, the outer wall groove 2h allows the deformation of the upper protrusion 2fc and the lower protrusion 2gc at the time of the side collision; therefore, an impact at the time of the side collision can be further absorbed compared to a case where the outer wall groove 2h is not provided.

A middle attachment plate 3 formed continuously from the bottom surface 2ha is located in the vehicle inner to outer direction substantially at the same position as the bottom surface 2ha of the outer wall groove 2h, which is located adjacent to the rear wall 2a (that is, substantially at the center of the protector 2 in the vehicle inner to outer direction). Specifically, the middle attachment plate 3 according to the present embodiment is formed to extend forward (in a direction separating from the rear wall 2a) beyond the front end portion 2r.

The middle attachment plate 3 includes a middle attachment hole 3a extending in the thickness direction. The middle attachment plate 3 is fixed, by the fastener 6 inserted into the middle attachment hole 3a, to a protrusion 4 formed at the door trim 1a to protrude toward the door panel 1b.

Also, the middle attachment plate 3 is configured to extend forward beyond the open front end portion 2r. With such a configuration, in the front end portion 2r that is formed with low rigidity because of not having a wall, rigidity of a portion of the protector 2 to which the middle attachment plate 3 is attached can be locally enhanced. Thus, a compression load is easily applied to the upper protrusion 2fc and the lower protrusion 2gc and therefore the upper protrusion 2fc and the lower protrusion 2gc are easily crushed. As a result, an impact absorbing function of the protector 2 can be enhanced.

Further, the middle attachment hole 3a extending in the thickness direction is formed in the center of the middle attachment plate 3. The middle attachment hole 3a functioning as an attachment portion is a hole through which the fastener 6 for attaching to the protrusion 4 of the door trim 1a is to be inserted. Furthermore, the periphery of the middle attachment hole 3a is formed in a cylindrical shape to protrude toward the door trim 1a (that is, toward the upper opposite surface 2f and the lower opposite surface 2g). A substantially cross-shaped rib 3b is formed to extend radially from an outer surface of the cylindrical portion. The rib 3b is formed in this manner and thereby rigidity of the periphery of the middle attachment hole 3a, strength of which is low in the middle attachment plate 3 can be enhanced.

Also, the middle attachment plate 3 extending from the bottom surface 2ha of the outer wall groove 2h is fixed to the protrusion 4 of the door trim 1a by the fastener 6 inserted into the middle attachment hole 3a, thereby functioning as a fixing portion in the inner to outer direction. Accordingly, a reaction force is also applied from the surroundings of the middle attachment plate 3 to the upper protrusion 2fc and the lower protrusion 2gc to which a load toward the vehicle inner side is applied when the upper protrusion 2fc and the lower protrusion 2gc is brought into contact with the door panel 1b at the time of a side collision of the vehicle. Therefore, the upper protrusion 2fc and the lower protrusion 2gc are relatively easily deformed and an impact can be easily absorbed compared with a case where the middle attachment plate 3 is not provided. When focused on the function of the middle attachment plate 3 as the fixing portion, the middle attachment plate 3 may be configured not only to extend forward from the bottom surface 2*ha* of the outer wall groove 2*h* beyond the front end portion 2*r* but also to extend rearward beyond the position of the closed rear wall 2*a*.

The protector 2 is fastened at three portions thereof by the fasteners 6 inserted into the upper attachment hole 2*j*, the lower attachment hole 2*m*, and the middle attachment hole 3*a*, thereby being attached to the door trim 1*a*. The protector 2 is attached at the three portions to the door trim 1*a* in this manner; therefore, the protector 2 can be prevented from being displaced and rotated when an impact is applied to the protector 2 at the time of a side collision.

In addition, as described above, the upper attachment plate 2*i* is attached to the upper wall 2*c* to be located adjacent to the inner wall 2*d* and the lower attachment plate 2*l* is attached to the lower wall 2*b* to be located adjacent to the inner wall 2*d*. The middle attachment plate 3 is formed at a position shifted forward of the upper attachment plate 2*i* and the lower attachment hole 2*m* in the vehicle front to back direction and outward of the upper attachment plate 2*i* and the lower attachment hole 2*m* in the vehicle width direction. Thus, the protector 2 is attached at different positions in the vehicle front to back direction and in the vehicle width direction to the door trim 1*a*. Consequently, an attachment state of the protector 2 to the door trim 1*a* is stable even when vibrations are applied during running of the vehicle.

The front end portion 2*r* that is a front end of the protector 2 is formed by respective front end surfaces of the lower wall 2*b*, the upper wall 2*c*, the inner wall 2*d*, the outer wall 2*e*, and the flange 2*k* (that is, by the end surfaces on the opposite side from the rear wall 2*a*). In other words, the front end of the protector 2 is not closed by a wall and is open. Thus, the protector 2 includes the open front end portion 2*r*, therefore being configured to be easily distorted at the front side and to easily absorb an impact at the front side at the time of a side collision compared with at the rear side. Moreover, demolding is easily performed at the time of injection molding; therefore, manufacturing costs can be reduced.

Three ribs 2*p* are formed on a front surface of the rear wall 2*a* to extend vertically from the front surface. Specifically, the three ribs 2*p* are configured such that the first one is located inward of the middle attachment plate 3 in the vehicle width direction (that is, adjacent to the inner wall 2*d*) while extending to connect the upper wall 2*c* to the lower wall 2*b*, that the second one extends perpendicular to the first one and connects the inner surface side of the bottom surface 2*ha* of the outer wall groove 2*h* of the outer wall 2*e* to the inner wall 2*d*, and that the third one connects the inner surface side of the lower opposite surface 2*g* of the outer wall 2*e* to the inner wall 2*d*. It is noted that the number of ribs 2*p* is not limited to three ribs, and plural ribs may be further provided.

Also, the rib 2*p* extending in a direction connecting the upper wall 2*c* to the lower wall 2*b* is not formed at a position closer to the outer wall 2*e* than the bottom surface 2*ha* of the outer wall groove 2*h*. Therefore, rigidity of the protector 2 is not enhanced at this position and in this direction. Consequently, the upper protrusion 2*fc* and the lower protrusion 2*gc* are not prevented from being deformed toward the inner wall 2*d* and downward and upward by the rib 2*p* at the time of a side collision and thus are formed to be easily crushed.

Further, as shown in FIG. 4, the protector 2 is formed such that a vehicle inner-outer length L5 of the protector 2 is larger than a front-back length L6 of the protector 2. In the protector 2 configured in this manner, the rear wall 2*a*, the lower wall 2*b*, and the upper wall 2*c* which extend in the vehicle inner to outer direction are easily crushed by a load applied from the outer wall 2*e* to the protector 2 at the time of a side collision and therefore are easily deformed in the inner to outer direction. As a result, the protector 2 easily absorbs an impact.

Furthermore, as shown in FIG. 5, the protector 2 is formed such that a vehicle up-down length L8 of the rear wall 2*a* of the protector 2 is larger than the front-back length L6 of the protector 2. As just described, the protector 2 is formed such that the up-down length L8 and the vehicle inner-outer length L5 are larger than the front-back length L6; thereby, precision in manufacturing by injection molding with molds can be increased and design changes can be easily made.

Specifically, at the time of injection-molding the protector 2, a mold (not shown) located at the side for forming the rear wall 2*a* and a mold (not shown) located at the side for molding the front end portion 2*r* are used. In this case, the rigidity of the protector 2 in the vehicle front to back direction can be easily adjusted by changing the depths of the molds to adjust the thickness of the rear wall 2*a*.

Moreover, the ribs 2*p* are formed to be exposed to the front end portion 2*r* that is the open side at which the mold is arranged to form the front end portion 2*r*. Therefore, the shape of the mold is changed and thereby the shape of the ribs 2*p* can be easily changed. As a result, the shape of the ribs 2*p* is changed, for example, into a grid shape or another shape or into a geometric pattern such as a truss shape and thereby the rigidity can be easily adjusted.

In addition, as shown in FIG. 5, the protector 2 is formed such that a portion of the protector 2 from which the upper attachment plate 2*i* and the lower attachment plate 2*l* are excluded has an up-down length L7 at the front side, which is larger than the up-down length L8 at the rear side. In the protector 2 configured in this manner, the front side of the protector 2 is easily distorted in the vehicle inner to outer direction by a load applied from the outer wall 2*e* to the protector 2 at the time of a side collision. Therefore, the protector 2 easily absorbs an impact applied to the front side thereof.

Modified Example

Figure 7:
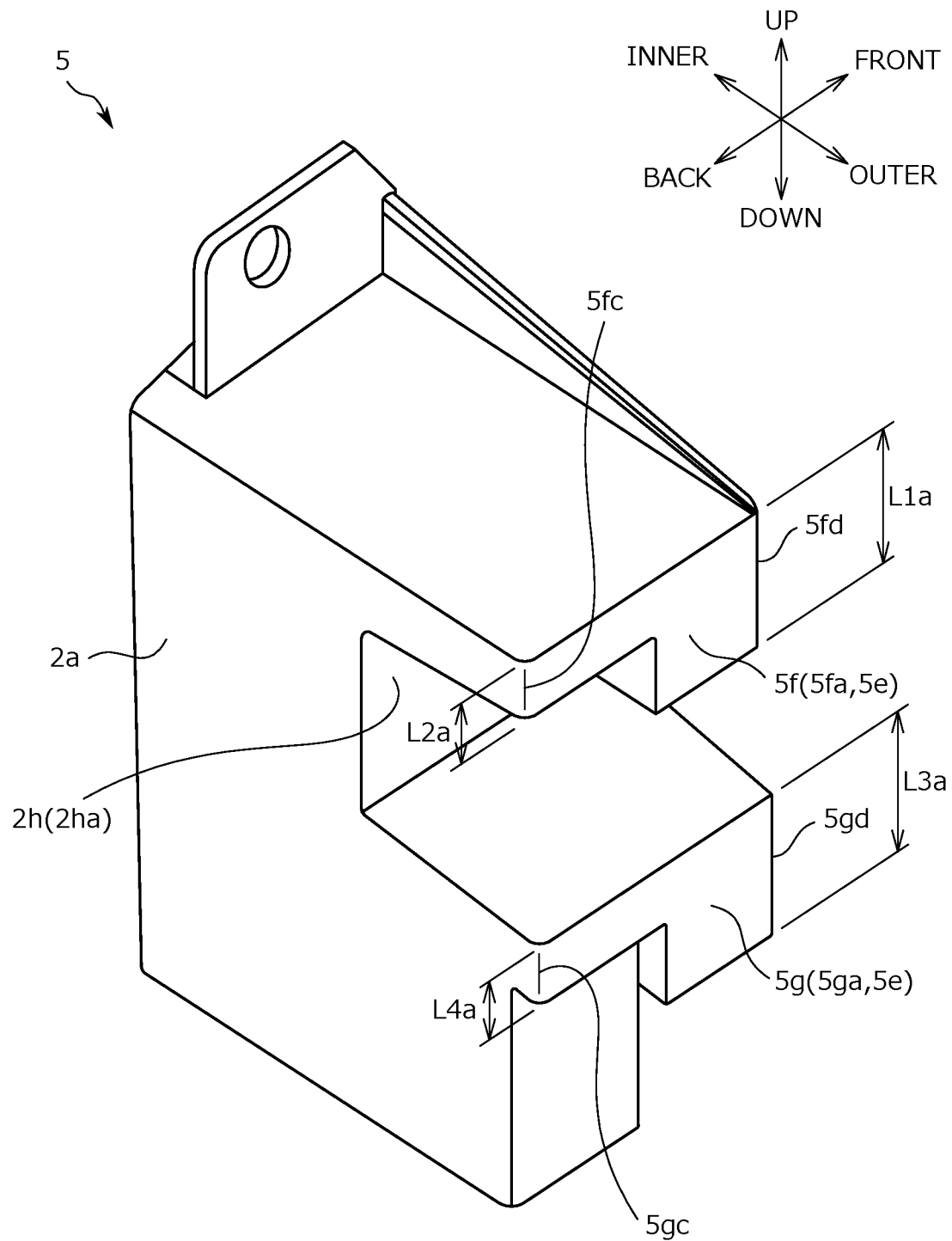
FIG. 7 is a perspective view showing a protector according to a modified example.

Next, a protector 5 as an impact absorbing member according to a modified example will be described with reference to FIG. 7. Here, FIG. 7 is a perspective view showing the protector 5 according to the modified example. It is noted that in the following descriptions of the modified example, the same names and reference numbers are assigned to the same features as those of the above embodiment and therefore those explanations are omitted and differences from the above embodiment are clarified.

An upper opposite surface 5*f* and a lower opposite surface 5*g* are partitioned surfaces of an outer wall 5*e* of the protector 5. Each of the upper opposite surface 5*f* and the lower opposite surface 5*g* is not formed in a tapered shape as in the above embodiment and is formed in an inverted L-shape. In addition, an upper protrusion 5*fa* and a lower protrusion 5*ga* are formed by the outer wall groove 2*h*. The upper protrusion 5*fa* is a portion protruding from the bottom surface 2*ha* of the outer wall groove 2*h* toward the vehicle outer side (toward the door panel 1*b*) and being at the side of the upper opposite surface 5*f*. The lower protrusion 5*ga* is a portion being at the side of the lower opposite surface 5*g*.

Moreover, a length L2a of a rear edge 5fc located at the rear side of the upper opposite surface 5f is formed to be shorter than a length L1a of a front edge 5fd located at the front side of the upper opposite surface 5f, and a length L4a of a rear edge 5gc located at the rear side of the lower opposite surface 5g is formed to be shorter than a length L3a of a front edge 5gd located at the front side of the lower opposite surface 5g.

The protector 5 is formed in this manner; thereby, when a load is applied from the outer wall 5e at the time of a side collision, of the upper opposite surface 5f and the lower opposite surface 5g, the front side of the protector 5 is easily distorted in the vehicle inner to outer direction. Consequently, the protector 5 easily absorbs an impact applied to the front side of the protector 5. In other words, when the load is applied from the outer wall 5e at the time of the side collision, the upper protrusion 5fa and the lower protrusion 5ga is deformed toward the inner wall 2d and downward or upward and can be easily distorted. Therefore, the protector 5 can easily absorb the impact.

In addition, if the rear edge 5fc and the rear edge 5gc are respectively shorter than the front edge 5fd and the front edge 5gd, the same effect as above can be achieved. Therefore, for example, a protector symmetrically formed in the up to down direction with respect to the upper opposite surface 5f and the lower opposite surface 5g may be applied.

Further, a lightening hole for reducing weight may be formed in any portion of the protector.

Furthermore, in above embodiment, a case where the protector is attached to the door trim and is attached at a position opposite to the door panel is described. Alternatively, the attachment relation may be reversed. That is, as long as an impact can be appropriately absorbed between the door trim and the door panel, the protector may be attached to either the door trim or the door panel.

Also, as described above, the vehicle interior component is described as an example of the present invention; however, the present invention is not limited to an interior component for a vehicle. Alternatively, the present invention can be applied to an interior component for a conveyance such as an airplane, a ship, or an industrial machine.

REFERENCE SIGNS LIST

1: side door component (vehicle interior component)
1a: door trim
   1aa: base material resin layer
   1ab: covering resin layer
1b: door panel
1c: door pocket
2: protector (impact absorbing member)
2a: rear wall
2b: lower wall
2c: upper wall
2d: inner wall
2e: outer wall
2f: upper opposite surface (partitioned surface)
   2fa: upper edge
   2fb: lower edge
   2fc: upper protrusion
2g: lower opposite surface (partitioned surface)
   2ga: upper edge
   2gb: lower edge
   2gc: lower protrusion
2h: outer wall groove (groove)
   2ha: bottom surface
2i: upper attachment plate
2j: upper attachment hole
2k: flange
2l: lower attachment plate
2m: lower attachment hole
2n: flange
2p: rib
2r: front end portion
3: middle attachment plate
3a: middle attachment hole (attachment portion)
3b: rib
4: protrusion
5: protector (impact absorbing member)
5e: outer wall
5f: upper opposite surface (partitioned surface)
   5fa: upper protrusion
   5fc: rear edge
   5fd: front edge
5g: lower opposite surface (partitioned surface)
   5ga: lower protrusion
   5gc: rear edge
   5gd: front edge
6: fastener

The invention claimed is:

1. A vehicle interior component comprising:
a door panel;
a door trim adapted to be attached to the door panel; and
a box-shaped impact absorbing member arranged between the door panel and the door trim and attached to one of the door panel and the door trim, wherein
a groove extending in a vehicle front to back direction is formed in an outer wall surface of the impact absorbing member, which faces an other one of the door panel and the door trim, and
the outer wall surface is partitioned into upper and lower partitioned surfaces by the groove, and at least one of the upper and lower partitioned surfaces has an up-down length at a vehicle front side, which is larger than an up-down length at a vehicle rear side.

2. The vehicle interior component according to claim 1, wherein at least one of the partitioned surfaces is formed in a tapered shape such that an up-down length decreases from a vehicle front side toward a vehicle rear side.

3. The vehicle interior component according to claim 1, wherein
the impact absorbing member includes an attachment portion attached to one of the door panel and the door trim,
the attachment portion is formed at a portion extending from a bottom surface of the groove, and
the partitioned surfaces are arranged closer to the other one of the door panel and the door trim than the attachment portion.

4. The vehicle interior component according to claim 1, wherein the impact absorbing member is configured such that only the front side in the vehicle front to back direction is open without a wall surface.

* * * * *